(12) United States Patent
Watt

(10) Patent No.: US 8,091,409 B2
(45) Date of Patent: Jan. 10, 2012

(54) PERCOLATION TESTING APPARATUS AND METHODS

(76) Inventor: Ryan Watt, Encino, CA (US)

( * ) Notice: Subject to any disclaimer, the term of this patent is extended or adjusted under 35 U.S.C. 154(b) by 127 days.

(21) Appl. No.: 12/621,705

(22) Filed: Nov. 19, 2009

(65) Prior Publication Data

US 2010/0064782 A1    Mar. 18, 2010

Related U.S. Application Data

(62) Division of application No. 11/961,802, filed on Dec. 20, 2007, now Pat. No. 7,640,792.

(51) Int. Cl.
*G01N 5/02* (2006.01)
(52) U.S. Cl. .......................................................... 73/73
(58) Field of Classification Search .................. None
See application file for complete search history.

(56) References Cited

U.S. PATENT DOCUMENTS

| | | | |
|---|---|---|---|
| 4,341,110 A * | 7/1982 | Block | 73/38 |
| 4,561,290 A | 12/1985 | Jewell | |
| 4,984,447 A | 1/1991 | Phillips | |
| 6,105,418 A | 8/2000 | Kring | |
| 6,324,900 B1 * | 12/2001 | Bruno et al. | 73/61.48 |
| 7,062,957 B2 | 6/2006 | Power | |
| 7,266,996 B2 | 9/2007 | Kristiansen | |
| 2003/0100247 A1 * | 5/2003 | Kim et al. | 451/60 |
| 2006/0225771 A1 * | 10/2006 | Crawford et al. | 134/21 |
| 2006/0277980 A1 * | 12/2006 | Kristiansen | 73/73 |

* cited by examiner

*Primary Examiner* — Hezron E Williams
*Assistant Examiner* — Mark A Shabman
(74) *Attorney, Agent, or Firm* — Kenneth H Ohriner; Perkins Coie LLP

(57) ABSTRACT

A storm water run-off percolation rate test system includes a turbid water generator having a silt or sediment source providing silt into a mixing tank. A pipeline carries turbid water from the mixing tank to a test pit or test site. A flow meter measures the amount of turbid water moved into the test pit. Detectors detect a water level in the test pit. A controller automatically controls the turbid water generator and flow of turbid water into the test pit, and records data on the amount of turbid water provided into the test pit over time, to determine a percolation rate. In a method for determining a percolation rate, turbid water is created and used in the percolation rate testing, to more accurately simulate run-off.

20 Claims, 9 Drawing Sheets

PERCOLATION TESTING APPARATUS AND METHODS

This application is a Divisional of U.S. patent application Ser. No. 11/961,802, filed Dec. 20, 2007, now U.S. Pat. No. 7,640,792.

BACKGROUND OF THE INVENTION

Construction of homes, buildings, roads and other development generally disrupts the hydrology, or the natural water cycle, of the local environment. The type, amount and locations of rain water runoff are changed. On undeveloped land, storm or rain water runoff tends to follow natural contours of the land, and can be absorbed by the soil. Grasses and vegetation on undeveloped land tend to slow movement of runoff, so that more of the runoff can evaporate or percolate into the ground. Construction of essentially water impermeable areas, such as buildings, roadways, sidewalks and parking lots, reduces natural ground absorption of water and increases runoff.

As the runoff flows over developed land, it can pick up pollutants such as fertilizers, motor oil, animal waste, etc. It also picks up soil particles or silt. Accordingly, allowing the runoff to flow into lakes, rivers or streams tends to degrade them with pollutants, and/or clog them with silt. Various federal and state laws consequently regulate runoff into streams and rivers. Diverting runoff into a manmade structure such as a sewer or drainage ditch can help to control movement of the runoff. However, the runoff ultimately still cannot be released into a natural body of water (including salt water bodies), without tending to degrade them.

To minimize runoff problems, in many areas of the country, drainage basins are constructed as part of the land development. Drainage basins are generally excavated areas having gradually sloping sides, although naturally occurring drainage basins may also be used. A filter strip or grass swale may be located uphill from the drainage basin, to help remove suspended particulate pollutants, before the runoff collects in the drainage basin. Construction of drainage basins is often legally required by local government agencies, as part of the development approval and permitting process.

The drainage basin ideally is located and contoured so that it collects as much differential runoff as possible from the developed land area, while also collecting little or no natural runoff. The drainage basin is also made large enough to avoid overflowing with differential runoff even during prolonged or intense rain storms. The bottom and sides of the drainage basin are generally porous, so that collected differential runoff diffuses into the ground over time. The design parameters of any specific drainage basin can vary widely depending on ground contours, surface soil and sub-soil conditions, climate, and other factors.

For many years, drainage basin designs have been tested by drilling one or more bores in the soil at or near the proposed drainage basin site, to create a runoff percolation test pit or site. The absorption rate of water from the test pit into the ground is then measured and recorded over a specified period of time. Based on these measurements, engineers can determine whether a proposed basin design is acceptable, or otherwise determine alternative design parameters for a drainage basin.

Unfortunately, these existing techniques have certain disadvantages. Since they are generally necessarily performed using city or tap water, rather than actual runoff, the test results may not accurately correlate to real world conditions. Existing testing techniques have also relied largely on manual observation and recording of water level data. As a result, the test data may be subject to variations. It is also then labor intensive, and hence costly to obtain.

Accordingly, improved testing apparatus and methods are needed.

SUMMARY OF THE INVENTION

New and highly improved apparatus and methods have now been invented, overcoming various of the problems associated with techniques used in the past. In a first aspect, a percolation test apparatus comprises a turbid water generator having a silt source and a water mixing tank. A pipeline carries turbid water from the mixing tank into a test pit. A flow measuring instrument measures the volume of water moving from the mixing tank into the test pit. One or more water level measuring instruments measure the water level in the test pit. A data recorder and/or controller are linked to the measuring instruments, and record data from the measuring instruments. The data may be used to determine percolation rates.

In a new method, silt or fine solids and tap water are mixed in a mixing tank, to create turbid water. The turbid water flows into an in-ground test site, to maintain the turbid water level in the test site near a selected nominal level. The amount of turbid water flowing into the test site is measured. Measurements taken over a selected time interval may be used to determine a percolation rate of the test site.

Other and further objects and advantages will appear below. The invention resides as well in sub-combinations of the elements and steps described.

BRIEF DESCRIPTION OF THE DRAWINGS

In the drawings, wherein the same reference number indicates the same element in each of the views.

DETAILED DESCRIPTION OF THE DRAWINGS

Figure 1:
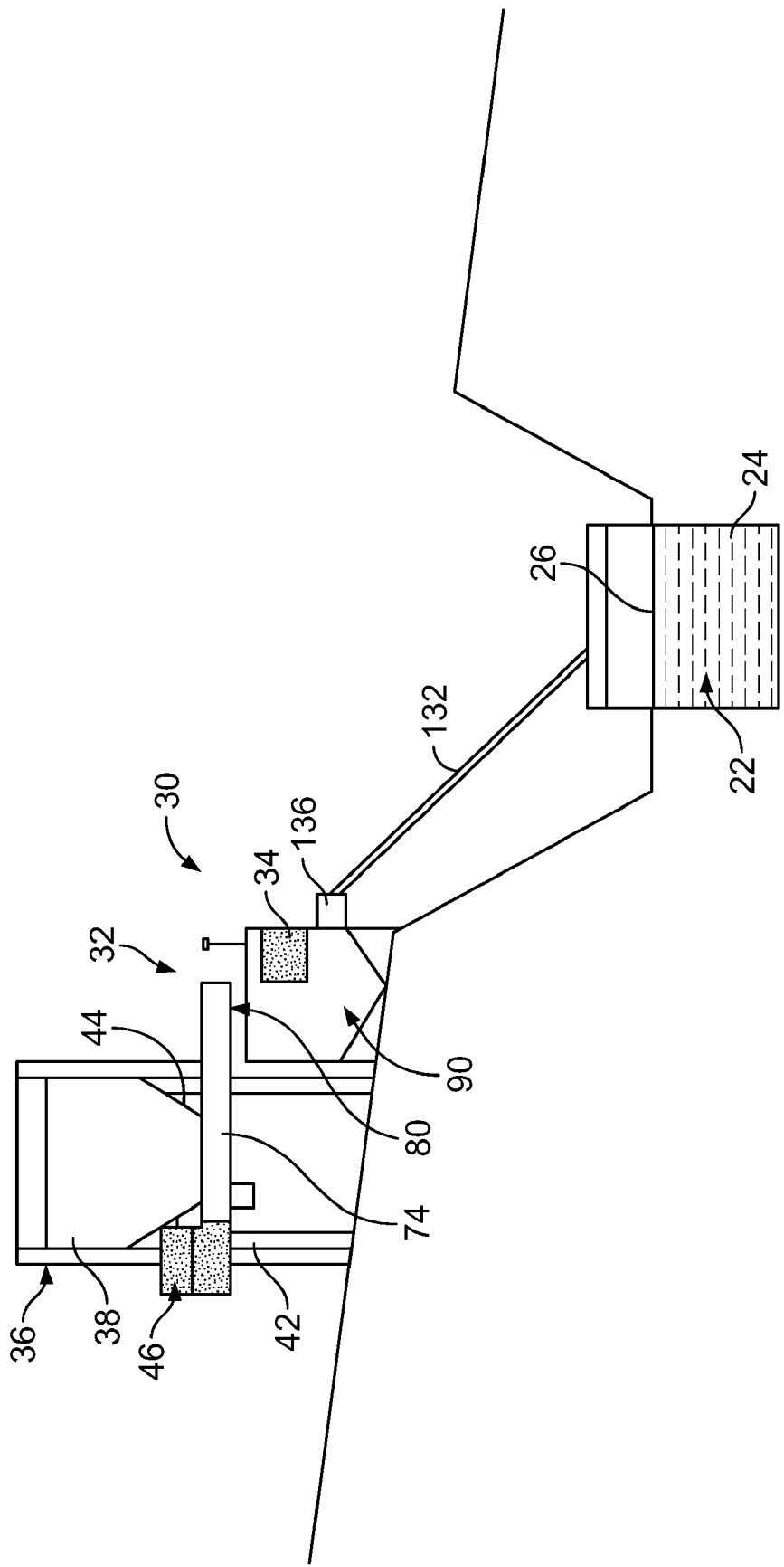
FIG. 1 is a schematic illustration of the present test apparatus, in one example.

Turning now in detail to the drawings, as shown in FIG. 1, a test system 30 is set up to conduct percolation testing. The test system 30 includes a turbid water generator generally designated as 32, a test pit 22, and a data recorder/controller 34. The test pit 22 is typically an excavated pit or opening in the ground constructed specifically for the test system 30. The test pit 22 is typically cylindrical, having a diameter of 3-10 or 4-6 feet, and a depth typically of about 3-10 or 4-6 feet. A test pit 22 may have other forms as well, such as a trench or stand pipe. It is also possible, in some instances, that a natural ground feature, could be used as a test pit, without the need for excavation and/or drilling.

As shown in FIG. 1, the test pit 22 is vertically below the turbid water generator 32. This allows turbid water 24 created in the turbid water generator 32 to move into the test pit 22, without pumping. Referring still to FIG. 1, the turbid water generator 32 includes a silt source 36 and a mixing tank 90.

Figure 2:
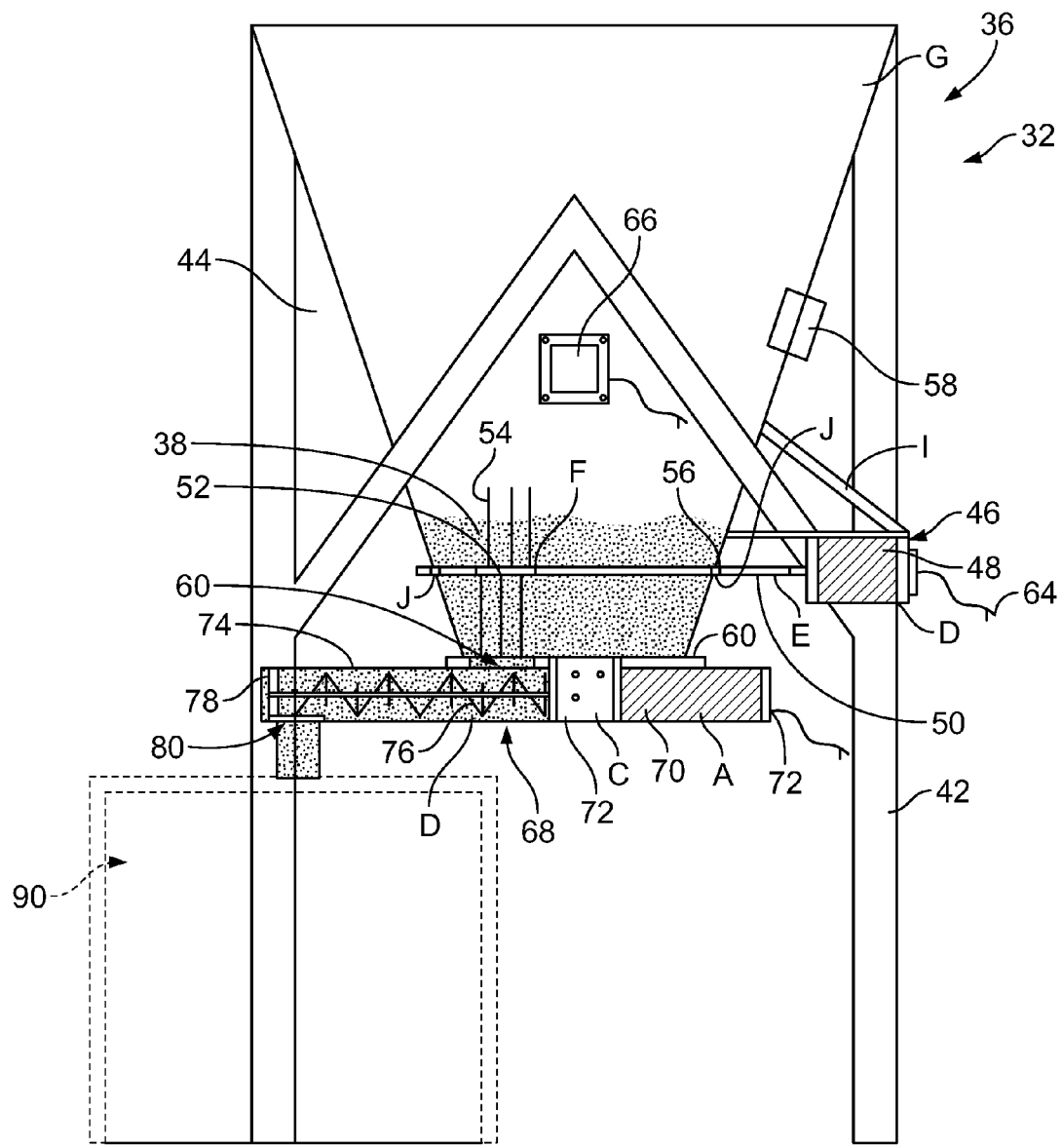
FIG. 2 is an enlarged side view of the silt source shown in FIG. 1.

Turning now to FIG. 2, the silt source 36 holds a supply of silt 38, and may periodically supply predetermined amounts of silt into the mixing tank 90. The silt typically includes fine soil particles collected up from the ground surface in or around the development site. As used here, silt means any type of fine solid particles. The silt 38 is intended to be of the same type that is naturally entrained into storm water runoff at the development site. FIG. 2 shows one example of a silt source 36. Of course, various other types and designs of silt sources maybe used, to add silt into water in the mixing tank 90. In the specific design shown in FIG. 2, the silt source 36 includes a vessel 44 supported on legs 42. The vessel 44 may be funnel-shaped. A bottom plate 60 closes off the lower end of the vessel 44. An inspection window 66 may be provided in the vessel 44, to allow for visual inspection inside the vessel 44.

A silt agitator 46 may also be included. In the design of FIG. 2, the silt agitator 46 includes a pin collar 52 mounted on a shaft 50. Pins 54 extend radially outwardly from the pin collar 52. The shaft 50 is supported via shaft bushings 56, on opposite sides of the lower end of the vessel 44. An agitator motor 48 turns the shaft 50. A motor controller 64 controls the agitator motor 48. Rotation of the shaft 50 causes the pins 54 to move through the silt 38, agitating and stirring the silt. The pins 54 which are typically 2-6 inches long, may be replaced with veins, paddles, chains, etc. Rotational movement of the pins 54 helps to stir and knock down silt, especially if the silt is wet and/or tends to clump up or stick to itself, or to surfaces within the vessel 44. The shaft 50 rotates at, for example, 5-50, or 10-30 rpm.

A vibrator 58 may be attached to the vessel 44 to vibrate the vessel, to better prevent silt from sticking to the vessel sidewalls. The vibrator 58 may be placed on the outside of the vessel 44, above the shaft 50.

A silt conveyor or mover 68 is positioned underneath the vessel 44. In the design shown, the silt conveyor 68 is attached to the bottom plate 60. While various types of silt conveyors may be used, in the example shown, the silt conveyor 68 includes an auger screw 76 within an auger tube 74. A silt trough or opening 62 through the bottom plate 60 allows silt 38 to move from the vessel 44 into the auger tube 74. An auger motor 70 turns the auger screw 76, moving silt within the auger tube 74 from the silt opening 62 to a silt discharge opening 80 positioned over the mixing tank 90. The outer end of the auger screw 76 may be rotatably supported in a bearing on an endplate 78, closing off the end of the auger tube 74. The auger motor 70 is controlled by an auger motor controller 72. The shaft 50 and the auger tube 74 may be substantially horizontal.

The agitator motor 48 may be driven through a delay switch or relay 144 (shown in FIG. 9), so that it can continue to operate for a specified amount of time, after the auger motor 70 stops, to provide sufficient free-flowing silt at the silt trough 62, for the next silt supplying event. The vibrator may also be connected to the delay switch 144, so that the vibrator 58 continues to operate for a pre-set amount of time after the auger motor 70 is turned off. The agitator motor 48 and the vibrator 58 may be single speed motors. The auger motor 70 is advantageously a variable speed motor, adjusted to provide enough silt to maintain a specified turbidity level.

While generally not required, the amount of silt moving through the system 30 may also be measured, for example, via weight sensors on the vessel 44 or by volume measurements.

Figure 3:
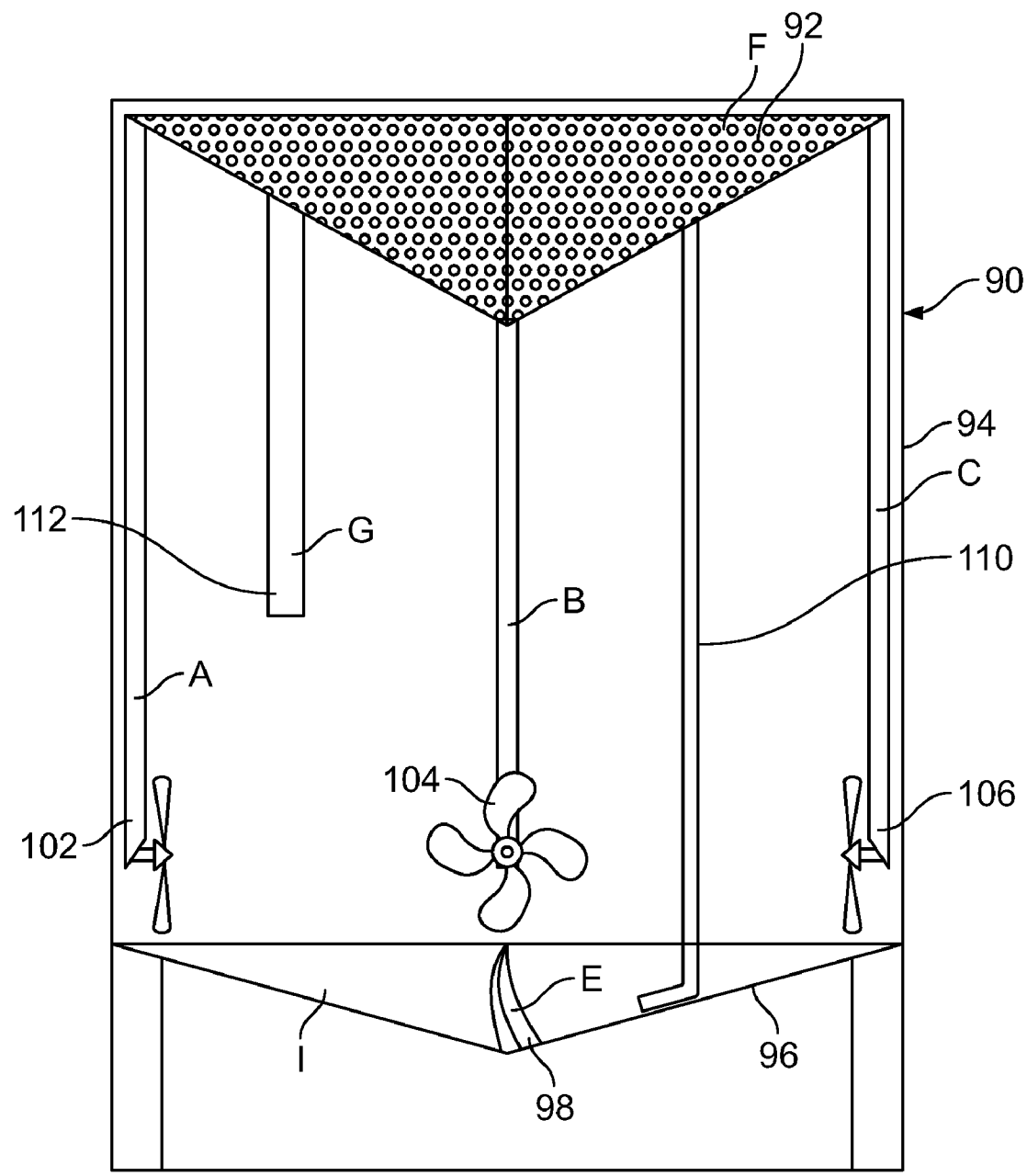
FIG. 3 is an enlarged side view, in part section, of the mixing tank shown in FIG. 1.
Figure 4:
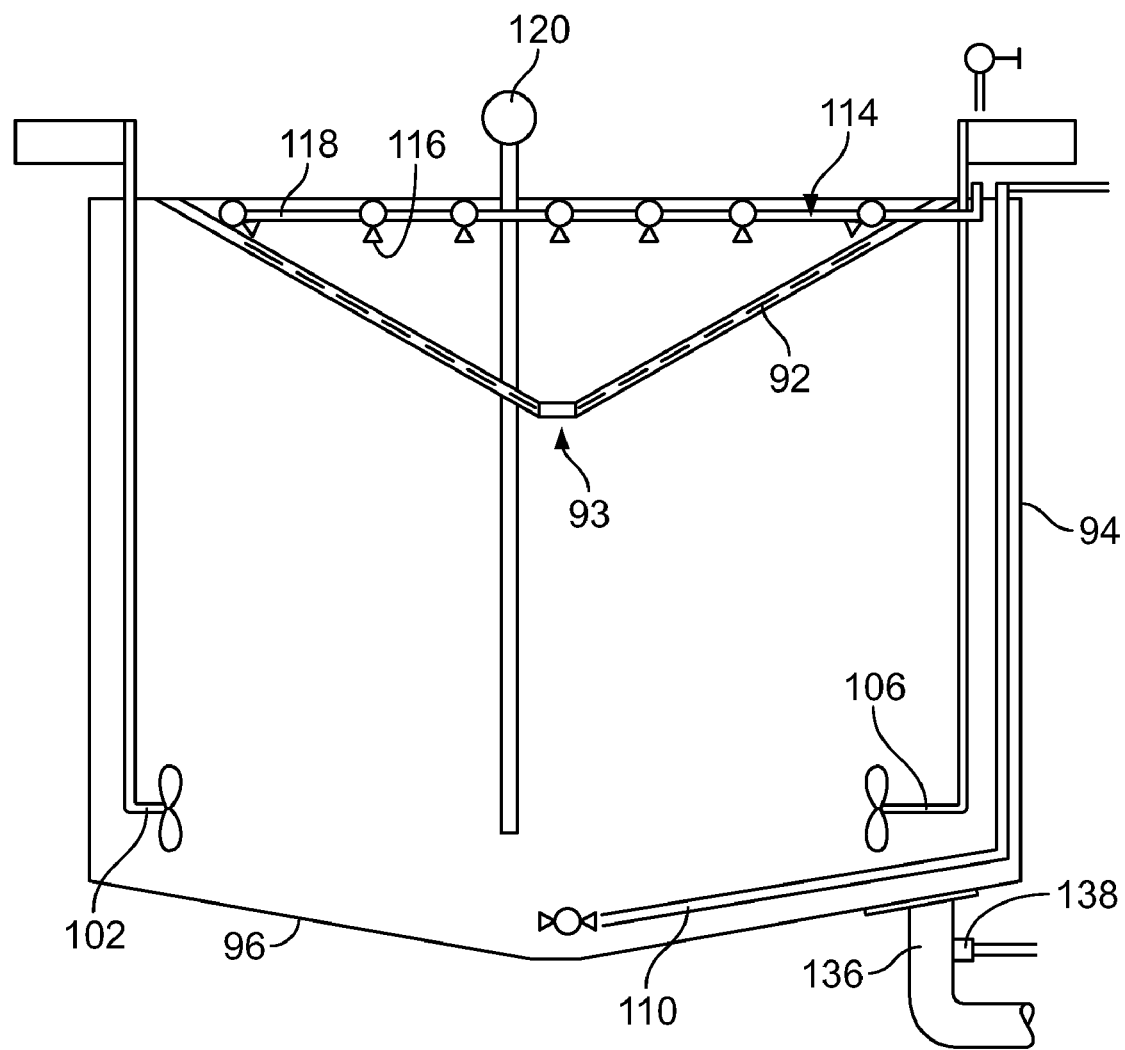
FIG. 4 is a section view of the mixing tank shown in FIGS. 1 and 3.

Turning now to FIGS. 3 and 4, the mixing tank 90 may also have various configurations. In the design shown, a mixing tank 90 has a circular or cylindrical sidewall 94 and a tapering or generally conical bottom 96. As shown in FIG. 3, a kicker fin 98 may be provided at the bottom, to help prevent silt from collecting on the bottom of the mixing tank, and to help evenly mix silt into the water. As shown in FIGS. 3 and 4, mixers are provided within the tank 90. The mixers 102, 104 and 106 as shown in FIG. 3, include a propeller attached to a mix motor. The mixers may have varying power, rotation speed, and/or propeller pitch, to create different mixing actions within the tank 90. The propellers may also be adjustable in height and direction. Each of the mixers 102, 104, and 106 may be optionally separately controlled, or they may be controlled in a group. The mixers 102, 104, and 106 may be high power, medium power, and low power mixers, respectively. Depending on the silt conditions, or other factors, one or more of the mixers 102, 104, and 106 may be omitted or not used. Other forms of mechanical mixers, such as paddles, vanes, wire forms, etc. may also be used. Hydraulic mixing via water jets, in addition to the inlet water supplies described below, may also be used, alone, or with mechanical mixers.

Figure 5:
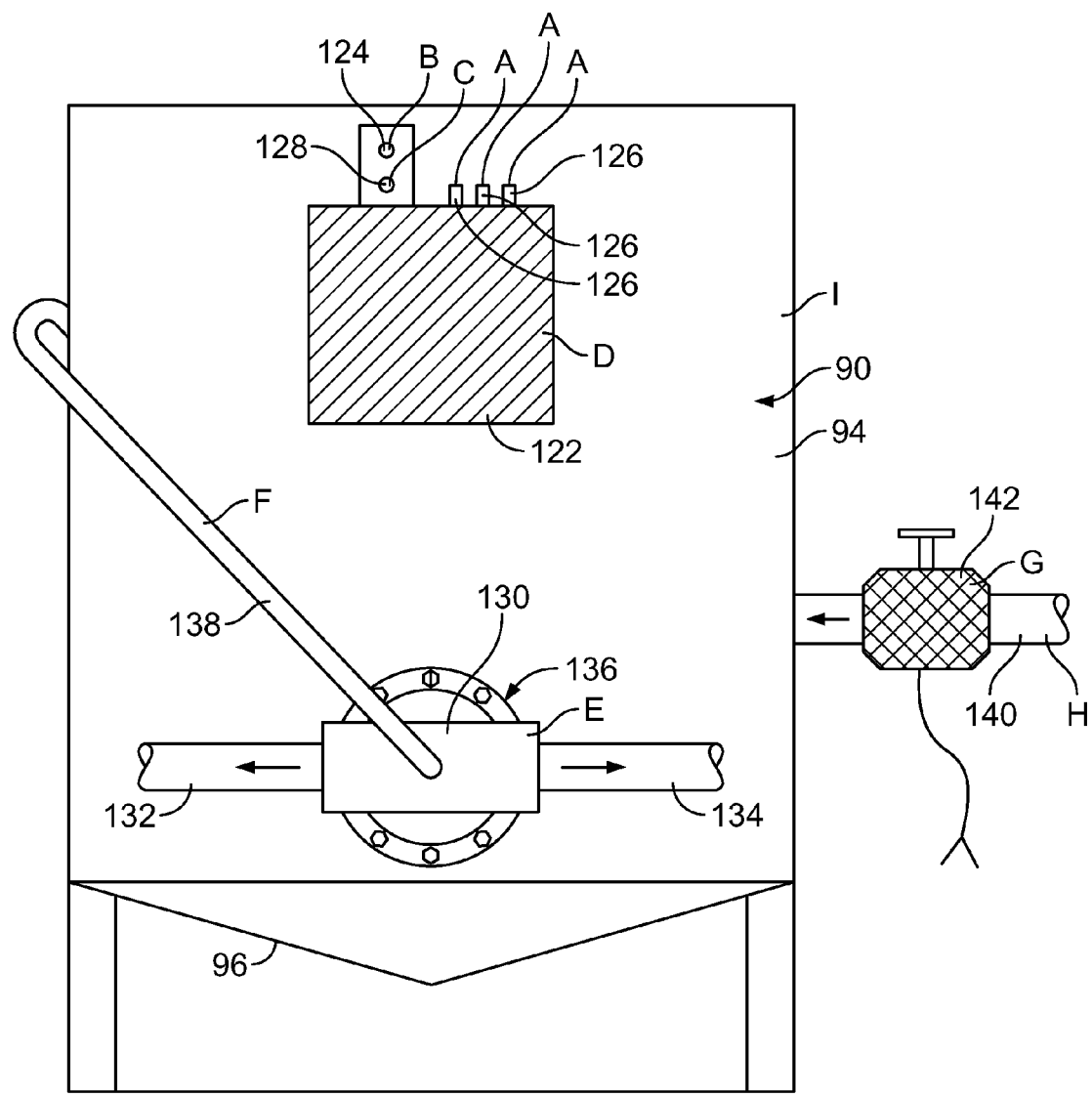
FIG. 5 is a front view of the mixing tank shown in FIGS. 1, 3 and 4.

Referring momentarily to FIG. 5, a main water line 140 supplies city or tap water to the mixing tank 90 through an automatically controlled valve 142. In areas where city water is not available, a pre-filled water tank may be used, with gravity as the pressure source for supplying water into the mixing tank. The mixing tank water inlet pipe 140 may be connected to a bottom water supply pipe 110 positioned to inject city or tap water at the bottom of the mixing tank 90, as show in FIG. 3. A rotation water supply pipe 112 is also supplied with city water from the inlet pipe 140. The rotation water supply pipe may be positioned to inject water into the mixing tank 90, typically in a direction tangential to the tank sidewalls, to induce swirling flow within the tank.

As shown in FIGS. 3 and 4, a strainer 92 may be provided near the top of the mixing tank 90. As shown in FIG. 3, the strainer 92, if used, may have multiple small openings, to allow silt particles to pass from the silt discharge opening 80 into a mixing tank 90, while straining out larger particles. As shown in FIG. 4, a central strainer opening 93 may be provided at the low point of the strainer 92. The strainer opening 93 allows rocks or other larger objects contained with the silt 38 to move to the center area of the mixing tank 90, where they will not interfere with the mixers.

As shown in FIG. 4, a strainer water supply 114 may be provided at the top of the strainer 92, to spray water into the strainer 92. The strainer water supply 114, if used, may include a strainer ring pipe or manifold 118, and multiple strainer spray nozzles 116 aimed to spray water into the strainer 92.

As shown in FIG. 4, a float switch 120 is provided in the mixing tank 90, to monitor the water level within a mixing tank, and also turn off water supply into a mixing tank 90, to prevent overflow. Within the mixing tank, the float switch 120 may operate the valve 142 (or separate valves on the mixing tank water supply types 110, 112, and/or 114), to keep the mixing tank filled to a desired level with water. The system may be set up via relays or via the programmable controller 34 so that when the float switch 120 closes, turning on water supply to the mixing tank, the motors in the silt source 36, specifically the agitator motor 48, the vibrator 58, and the auger motor 70, are also turned on.

FIG. 5 shows an outside front view of the mixing tank 90. A control/wiring box 122 may be attached to the mixing tank 90. The data recorder/controller 34 may be installed within the box 122. Individual power switches 126 may be provided for each of the mixer motors. A main power switch 124 may also be provided, along with a manual on/off switch 128. An outlet 136 may be provided at the lower end of the tank sidewall, as shown in FIG. 5, or through the bottom, as shown in FIG. 4. A clearing water line may connect to a flush port 138, to help reduce silt build up at the outlet 136. As shown in FIG. 5, a plumbing T 130 connects the outlet 136 to a first pit line 132 and a second pit line 134. This allows the mixing tank 90 to supply turbid water to two separate test pits 22. Of course, additional test pits may also be supplied, by increasing the capacity of the mixing tank 90 and via use of a distribution manifold, or multiple T-fittings.

Figure 6:
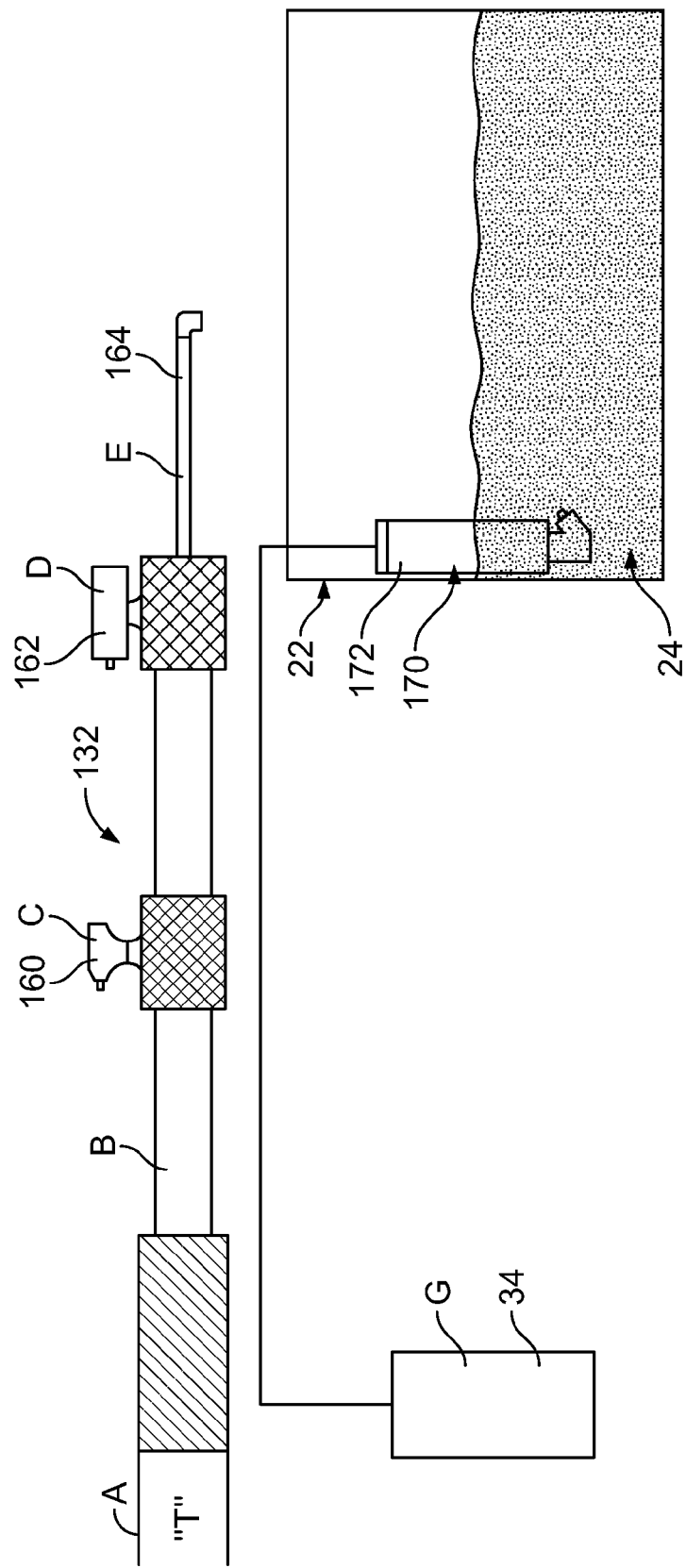
FIG. 6 is a schematic illustration of a supply line for supplying turbid water into a test site or pit.

FIG. 6 shows a pit supply line, such as line 132 and a test pit 22. A flow meter 160 measures flow through the line 132. Various types of flow meters may be used, including magnetic meters and other types. A pit supply valve 162 controls flow of water from the pit supply line 132 out through a pit spout 164 and into the test pit 22. The pit supply valve 162 may be automatically controlled, as described below.

Figure 7:
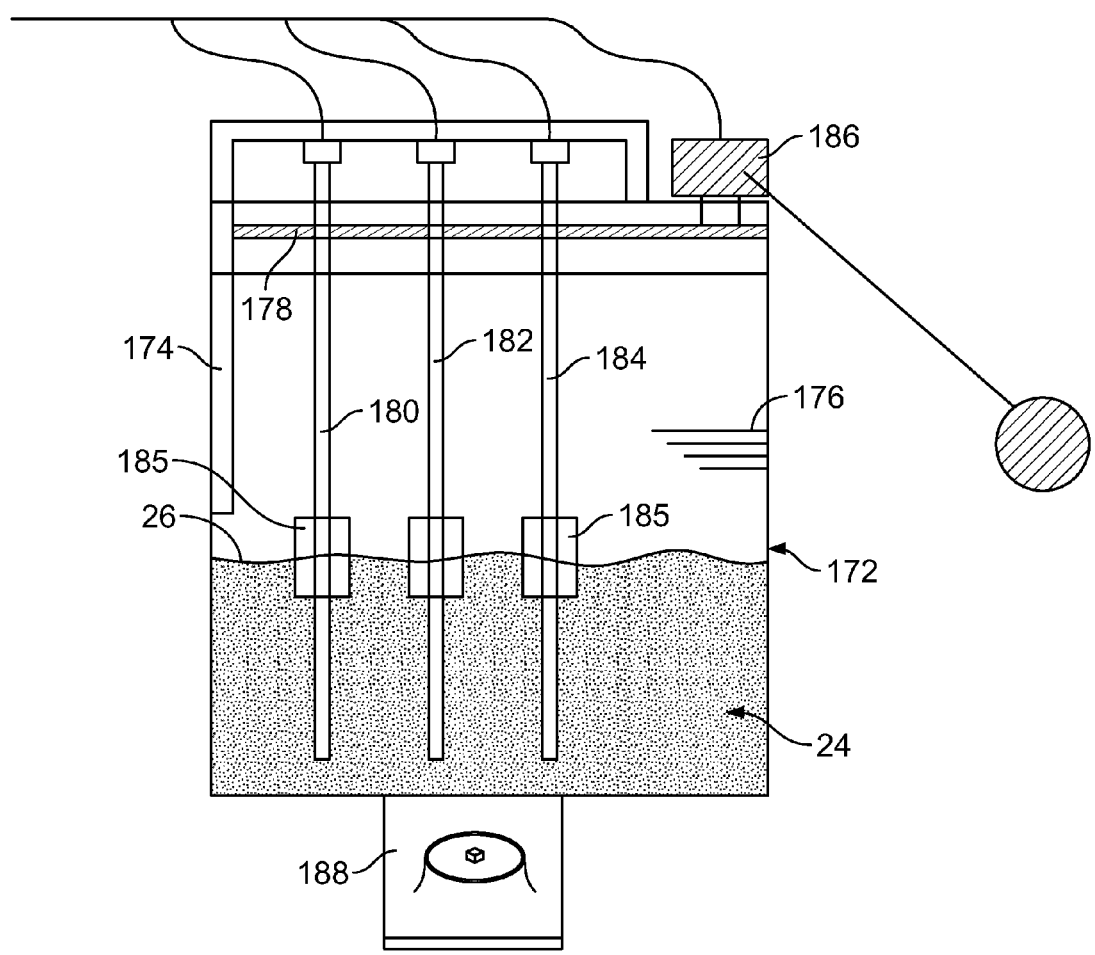
FIG. 7 is an enlarged schematic illustration of the float box containing float sensors, shown in FIG. 6.

Referring to FIGS. 6 and 7, a system 170 for measuring the water level in the test pit 22 is provided. In the design shown, the pit water level measuring system 170 includes multiple float sensors within a float box 172. The float box 172 is attached to a sidewall of the pit via a bracket 174, so that the float box 172 is fixed in position. The float box 172 may be a rectangular open end box with a screen on the bottom, to allow water to enter, while reducing or avoiding turbulence. Since the bottom of the float box is substantially open, the water level within the test box is the same as the water level in the test pit.

Other types of liquid level sensors may be used, including optical, sonic, electrical, and other types. As also shown in FIG. 6, wiring from the float sensors in the float box 172 connect to the data recorder/controller 34.

Figure 9:
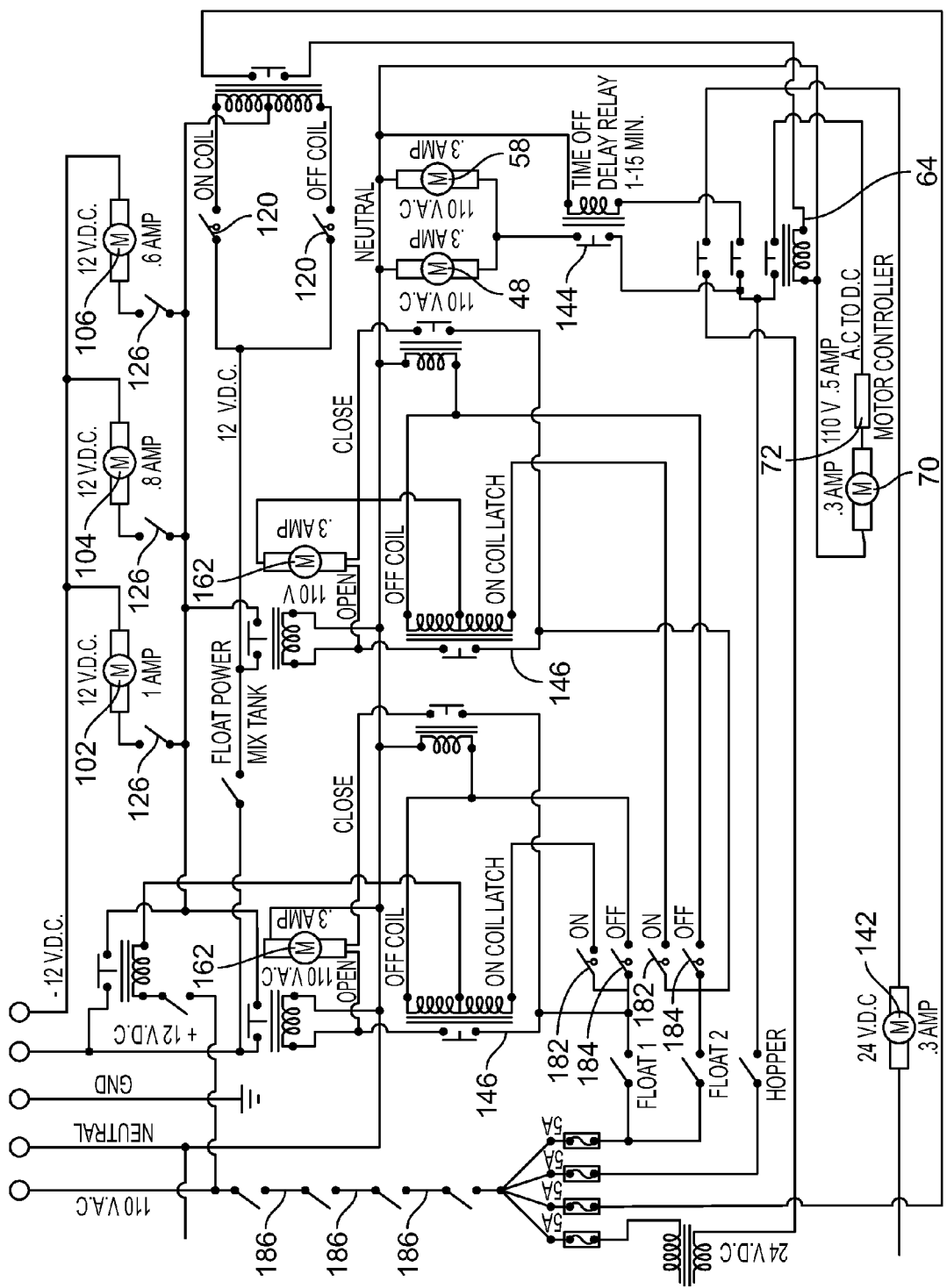
FIG. 9 is a wiring diagram illustrating representative electrical connections between selected components of the system shown in FIG. 1.

Turning to FIG. 7, three float sensors 180, 182 and 184 are shown in the float box 172. The first float sensor 180 may provide a continuous level output signal to the data recorder/controller 34, so that the level of water within the test pit 22 may be continuously monitored. The second float sensor 182 may act as a "switch on" indicator, such that when the float 185 on the second float sensor 182 sinks to a predetermined level, the float sensor 182 sends a signal that opens the test pit supply valve 162, to increase the level of water in the test pit 22 back to a desired nominal level. The third float sensor 184 may be a "switch off" indicator, with the float sensor 184 providing a signal that cuts off power to the pit supply valve 162, to stop filling the pit 22 with turbid water, when the float 185 on the third float sensor 184 rises to a predetermined level. The float sensors 182 and 184 may be linked or wired to a relay 146, as shown in FIG. 9, or to the data recorder/controller 34.

As also shown in FIG. 7, the float sensors 180, 182 and 184 may be mounted on a top bracket 178 attached to the float box 172. A visual depth scale 176 may be marked on the outside of the float box 172, to allow for visual (manual) measurement of the water level in the test pit 22. The float box 172 may also include a float driven kill switch 186, which turns off virtually all of the systems supply components, when the water level in the pit reaches a predetermined maximum level, to avoid overflow. As shown in FIG. 7, the float for the kill switch 186 is positioned outside of the float box 172, while the float sensors 180, 182, and 184 are within the float box 172. A strainer/cleanout 188 may be provided at the bottom of the float box 172, for maintenance.

Figure 8:
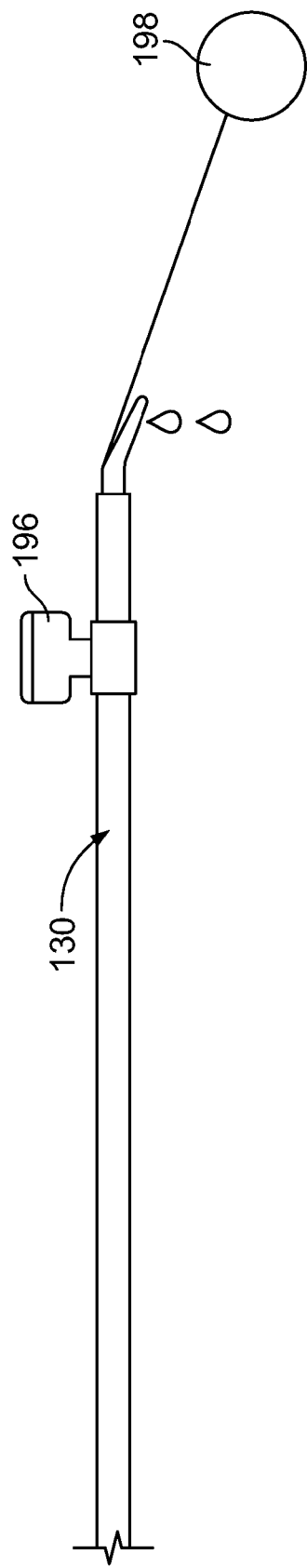
FIG. 8 is a schematic illustration of an alternative valve control.

FIG. 8 shows an alternative embodiment having a pit supply valve 196 which is mechanically controlled by a float 198 on the surface of the turbid water within the test pit 22. A design shown in FIG. 8 may be used for a static level test where the water level is maintained substantially constant, and the volume of water provided into the test pit is measured and recorded periodically (e.g. daily). Unlike the automatic valve 162 shown in FIG. 6, which typically will switch between off and on, the valve 196 in FIG. 8 may operate between a range of a very slow trickle to a full open position, depending on the level of the float 198.

Although the drawings show the various measuring components, valves, switches and data recorder/controller connected via wires, other types of links, such as wireless, infrared, etc. may also be used in certain applications. FIG. 9 shows a representative wiring diagram for the system shown in FIG. 1, although of course various alternatives may be used. In FIG. 9, the motors for the mixers are shown at 102, 104 and 106. These may respectively be high, medium and low power mix motors. Switches 126 switch the motors on or off. The float switch 120, shown in FIGS. 4 and 9, may directly or indirectly operate the agitator motor controller 64, and operation of the tank water supply valve 142 (shown in FIG. 5), and the auger motor controller 72.

In use, the location of the test pit is determined, and the test pit is then constructed, typically via excavation or drilling. In many applications, several test pits may be constructed sufficiently adjacent to each other so that they may be supplied by a single turbid water generator 32. Test pit specifications may be specified by government agencies. The test pits may be located at the invert of a proposed drainage basin. The test pit may be pre-saturated with city water, or turbid water, before testing begins, to reduce or avoid the transient effects of dry ground conditions.

Once the test pits are constructed, the test system 30 may be moved into position. Referring to FIG. 1, the turbid water generator which includes the silt source 36 and mixing tank 90, may be provided on a truck or trailer, so it may be conveniently moved and positioned as needed. Silt 38 is collected from nearby areas and loaded into the vessel 44, e.g., with a front end loader, conveyor belt, or other automatic or manual means. A main water line 140 is connected to the mixing tank 90. A pit line 132 is connected to the outlet 136 of the mixing tank 90, and positioned to supply turbid water into the test pit 22. The float box 172 is installed in the test pit. If a single turbid water generator is to supply multiple test pits, then additional pit lines and float boxes are installed.

The system 30 is set up to obtain accurate data of the percolation rate with turbid water, automatically. Initially, the mixing tank 90 is filled with city water (clean water) flowing in through the main water line 140 and then into the mixing tank 90 via the bottom water supply pipe 110, the rotation water supply pipe 112 and the strainer water supply 114. The agitator motor 48, vibrator 58 and auger motor 70 are turned on. Silt moves down through the vessel into the auger tube 74, and out the silt discharge opening 80, and into the mixing tank 90. The silt supply rate may be adjusted by varying the speed of the auger motor 70. This, and the other controls described may be performed manually, or automatically via the data recorder/controller 34. The action of the silt agitator 46 tends to move silt into the auger tube 74 without open cavities, to allow for more uniformed silt supply rates.

Some silt passes through the openings in the strainer 92. Other silt which deposits on the strainer may be washed into the mixing tank 90 via water spray from the strainer spray nozzles 116. The strainer helps to distribute the silt over a larger surface of the water in the tank, to promote more uniform mixing and to reduce clumping.

The mixers 102, 104 and 106 may be switched on before the silt source motors 48, 58 and 70, so that the silt falls into turbulent water in the mixing tank. Alternatively the mixers may be turned on simultaneously with the silt source motors. The mixers vigorously mix the silt into the water in the mixing tank 90, creating turbid water. With the turbid water level within the test pit 22 below nominal, the pit supply valve 162 (or 196) remains open, with the supply line 132 supplying turbid water into the pit. As turbid water flows into the pit, city water will ordinarily continue to flow into the mixing tank, and the silt source 36 will continue to provide silt into the mixing tank 90. When the turbid water level within the pit 22 reaches its nominal test level, the "off" sensor 184 sends a signal to the supply valve 162 and/or controller 34 causing the valve 162 to close. City water supply into the mixing tank 90, as well as supply of silt 38 into the mixing valve tank is stopped. These controls may be performed via wiring and relays, or via the data recorder/controller 34.

Turbid water continuously percolates or diffuses out of the test pit 22 into the surrounding ground. The percolation rate will vary depending on the ground conditions. For example, in highly porous ground such as ground having a high sand or gravel content, the percolation rate may be high. In contrast, ground having more impermeable materials, such as clay, will tend to have lower percolation rates.

As turbid water percolates out of the test pit 22, the water level in the test pit, indicated at 26 in FIG. 1, drops. The floats 185 on the float sensors 180, 182, and 184, correspondingly move down. When the float 185 of the float sensor 182 drops to a specified level, for example, 2 inches below the nominal level, the float sensor 182 generates a signal closing a latching ON relay 146, shown in FIG. 9. When the relay 146 closes, the pit supply valve 162 opens, supplying turbid water into the test pit. The mixers 102, 104, and 106 are turned on, generally along with the agitator motor 48, the auger motor 70, and vibrator 58. Under certain conditions, the agitator motor 48, the vibrator 58 and/or the mixers, may already be running. The pit supply valve 162 then opens, optionally after a pre-determined delay (to allow time for mixing of silt with water in the mixing tank 90, before moving water from the mixing tank 90 into the test pit 22).

As turbid water refills the test pit 22, the water level rises back up to the nominal level. When the water level reaches the nominal level, the float 185 on the float sensor 184 moves up sufficiently to trigger the float sensor 184, causing the pit supply valve 162 to close, and generally also stopping the agitator motor 48, auger motor 70 and vibrator 58, optionally after a preset time delay.

The float sensor 180 may be a continuous output level sensor, providing a continuous electrical output (e.g., 4-20 mA) for logging and monitoring the water level in the test pit. The kill switch 186 is provided at the top of the float box 172, to avoid interfering with testing. In the event that the float sensor 184 does not operate, the kill switch 186 turns off power to all components, except for the data recorder/controller 34) and closes all valves, to prevent overflow. The system 30 may continue to operate as described above, with turbid water supplied into the test pit 22, as needed, to maintain the water level in the test pit 22 within a predetermined level of the nominal level.

The flow meter 160 measures flow, typically volume flow, such as gallons, into the test pit 22. The data recorder/controller 34 has an internal clock, and is linked to the flow meter 160. Accordingly, the data recorder/controller 34 can record flow of turbid water into the test pit, as a function of time, thereby providing a percolation rate. After the test system 30 is installed, it may run for a pre-set time interval, such as two weeks, to collect data sufficient to accurately determine a percolation rate. Since the test system 30 is automated, it can run unattended, if necessary. The data recorded in the data recorder/controller 34 may be processed and prepared for review in text or graphical form. The data may optionally be sent via telemetry to a distant location.

The amount of city water and silt provided into the mixing tank 90 are adjusted to achieve a desired level of turbidity. In a typical test set up, the flow rates of water and silt are adjusted to obtain a minimum sediment load of 1000 Nepthelonetric turbidly units (NTU). The turbid water generator 32 (which includes the silt source 36 and the mixing tank 90) may be set to provide higher turbidity, since turbidity levels above the minimum are generally acceptable for test purposes, whereas turbidity levels below the minimum will generally not be acceptable. The turbidity of the turbid water may be measured manually, or automatically, via water samples taken from the test pit 22.

Thus, novel systems and methods have been shown and described. Various changes, substitutions, and use of equivalents may of course be made, without departing from the spirit and scope of the invention. The invention, therefore, should not be limited, except by the following claims and their equivalents.

The invention claimed is:

1. A method comprising:
   A] moving a controlled amount of silt and a controlled amount of water into a mixing tank to make turbid water;
   B] providing the turbid water into an in-ground test site;
   C] detecting when the turbid water level in the test site drops below a first specified level;
   D] providing additional turbid water into the test site until the water level in the test site exceeds a second specified level;
   E] repeating steps B-D over a period of time; and
   F] recording data while performing one or more of steps C-E.

2. The method of claim 1 further comprising providing the turbid water by moving the silt from a silt vessel into the mixing tank and mixing the silt and water in the mixing tank, to make turbid water.

3. The method of claim 2 further comprising controlling flow of water into the mixing tank based on a measurement of a water level in the in-ground test site.

4. The method of claim 2 further comprising controlling flow of silt into the mixing tank based on a measurement of a water level in the in-ground test-site.

5. The method of claim 2 further comprising stirring the water in the mixing tank for a predetermined interval of time, before moving turbid water from the mixing tank into the test site.

6. The method of claim 2 further comprising collecting the silt used to make the turbid water from within 5000 feet of the test site.

7. The method of claim 1 further comprising measuring the amount of turbid water provided into the in-ground test site.

8. The method of claim 1 further comprising measuring the turbidity of the turbid water supplied into the test site.

9. The method of claim 1 further comprising substantially continuously measuring and recording the water level in the test site.

10. The method of claim 1 wherein the turbid water has at least about 1000 NTU.

11. The method of claim 1 wherein the test site comprises a standpipe and step F is performed for at least two weeks.

12. A method comprising:
A] providing silt and clean water into a mixing tank;
B] mixing the silt and clean water in the mixing tank to produce turbid water;
C] moving turbid water from the mixing tank into an in-ground test site;
D] measuring the amount of turbid water moved from the mixing tank into the ground test site;
E] measuring the water level in the test site;
F] detecting when the water level in the test site drops below a first specified level;
G] moving additional turbid water from the mixing tank into the test site until the water level in the test site exceeds a second specified level;
H] recording the measurements from steps D and E; and
I] repeating steps C-H over a period of time.

13. The method of claim 12 further comprising measuring and recording a turbidity level of the turbid water.

14. The method of claim 13 further comprising measuring the water level in the test site via float sensors.

15. The method of claim 12 further comprising performing step A when the water level in the test site drops below the first specified level.

16. The method of claim 12 further comprising stirring the water in the mixing tank for a predetermined interval of time, before moving turbid water from the mixing tank into the ground site.

17. The method of claim 12 wherein the turbid water has at least about 1000 NTU.

18. The method of claim 12 with the silt collected from within 5000 feet of the test site.

19. The method of claim 12 wherein the test site comprises a standpipe and the period of time is at least two weeks.

20. A method comprising:
A) moving a controlled amount of silt from a silt vessel, and a controlled amount of water, into a mixing tank;
B) mixing the silt and water in the mixing tank, to make turbid water;
C) moving turbid water from the mixing tank to an in-ground test site;
D) detecting when the turbid water level in the test site drops below a first level;
E) providing additional turbid water to the test site until the water level in the test site exceeds a second level;
F) repeating steps C-E; and
G) measuring and recording the amount of turbid water provided into the in-ground test site over time.

* * * * *